United States Patent Office 3,193,518
Patented July 6, 1965

3,193,518
HIGH IMPACT POLYSTYRENE
Hans E. Lunk, Oakland, Calif., assignor to Shell Oil Company, New York, N.Y., a corporation of Delaware
No Drawing. Filed Jan. 23, 1961, Ser. No. 83,932
4 Claims. (Cl. 260—31.2)

The present invention relates to molding compositions comprising polyvinyl aromatic compounds. More particularly, this invention relates to a high impact polystyrene molding composition.

It is known that polyvinyl aromatic compounds such as polystyrene have improved properties of toughness when a small amount of rubbery polymer is incorporated therewith. It is also known that in order to mold thermoplastic compositions such as polystyrene, it is necessary to employ agents to improve the moldability of the compositions. Thus, it is important to include a lubricant with the composition in order to give the desired properties of flow, prevent sticking to the mold, and the like. However, the use of a lubricant, even in relatively small amounts, has a marked effect on the strength properties of polyvinyl aromatic materials such as polystyrene.

It is a primary object of this invention to provide a lubricant for polyvinyl aromatic molding compositions which provides the desired flow properties and increased heat distortion temperature. Another object of this invention is to provide a lubricant for polyvinyl aromatic compositions which provides the desired toughness and yet which is comparatively inexpensive.

These and other objects are accomplished by incorporating a lubricant in polyvinyl aromatic molding compositions, which lubricant comprises from about 1.5 to about 4.5 parts by weight of a low molecular weight polymer of a vinyl aromatic compound and from 0.5 to about 2.5 parts by weight of a member of the group consisting of hydrocarbon oil and an ester lubricant.

In its broad aspect, the present invention embraces molding compositions of vinyl aromatic resins which are solid polymers and copolymers of monovinyl aromatic compounds having the vinyl group attached to a carbon atom of the aromatic nucleus substituted with one or more groups such as methyl, ethyl and chloro groups. However, the preferred polyvinyl aromatic resins utilize styrene as the vinyl aromatic constituent. In addition to the vinyl aromatic constituent, the molding compositions of the present invention also contain a rubbery polymer in order to improve the properties of toughness. Examples of such rubber polymers include polybutadiene, polyisoprene, copolymers of butadiene and styrene and copolymers of butadiene and acrylonitrile. The preferred polymers suitable for this invention consist essentially of styrene and butadiene components.

The relative proportions of polyvinyl aromatic material and rubbery polymer should be within the range of from about 85 to 98 parts by weight of polyvinyl aromatic materials and from about 2 to about 15 parts by weight of rubbery polymer.

The lubricant used in the present invention consists essentially of about 1.5 to about 4.5 parts by weight of a low molecular weight polymer of a vinyl aromatic compound and from 0.5 to about 2.5 parts by weight of a member of the class consisting of a hydrocarbon oil and an ester lubricant. The amount of lubricant used will vary with the particular resin and the properties desired, but it will generally be within the range of from about 1 to about 6 parts by weight of lubricant per 100 parts by weight of resin.

The low molecular weight polymer of a monovinyl aromatic compound is of the same class as that for the high molecular weight polymer. Preferably the low molecular weight polymer is polystyrene.

The low molecular weight polymer increases the melt index of polystyrene without serious decrease in heat distortion temperature and other physical properties. However, it does not impart sufficient elongation to the high impact polystyrene. Yet, the combination of the low molecular weight polymer of this invention and a small amount of hydrocarbon oil or ester lubricant provides the desired elongation together with the other improved properties.

The molecular weight of the low molecular weight component is between about 1500 and 40,000, and preferably between 10,000 and 30,000. As opposed to this, the molecular weight of the high molecular weight polyvinyl aromatic compound is above about 100,000 and preferably above 150,000.

As indicated above, the lubricant component selected from the class consisting of hydrocarbon oils and ester lubricants is necessary to provide the desired elongation. However, the amount of this component should be held to a minimum to prevent undue loss in heat distortion. Therefore, the amount of this component should be in the range of about 0.5 to 2.5 parts and preferably 0.5 to 1.5 parts per 100 parts resin.

The ester lubricant may be any of the class shown in U.S. Patent No. 2,485,592 such as the alkyl esters of higher fatty acids. Specific examples include ethyl stearate, propyl oleate, butyl stearate, ethyl palmitate, amyl stearate and methyl 12-hydroxystearate. Preferred esters include esters of saturated acids having 14 to 20 carbon atoms and saturated alcohols having from 1 to 8 carbon atoms.

The hydrocarbon oil may be of those known in the trade as white mineral oils. Such mineral oils consist principally of saturated aliphatic hydrocarbons and those applicable to the present invention have a boiling point between about 400 and 1,000° F. and preferably have a gravity of above 30° API at 60° F. A typical example of a preferred mineral oil has a gravity of 32.5° API, a pour point of —15, a viscosity (Universal Saybolt seconds at 100° F.) of 104 and an initial boiling point of 584° F.

*Example 1*

A high impact molding composition was prepared by forming a solution of 6% by weight of S–1006 rubber in styrene. The S–1006 is a "hot" rubber containing 77% butadiene and 23% styrene. To 100 parts of this solution polystyrene having a molecular weight of 20,000 was added in the amounts shown in the table below for different runs. The solution was then heated for 10 hours at 95° C., 2 hours at 120° C., 2½ hours at 145° C. and 18 hours at 180° C. to effect polymerization of the styrene. The effect of the low molecular weight polystyrene is shown in the table below.

| Parts per hundred 20,000 molecular wt. polystyrene | Melt Index Method "G" | Heat Distortion Temp., °C., annealed |
|---|---|---|
| 0 | 1.7 | 86 |
| 2 | 1.8 | 88 |
| 4 | 2.4 | 88 |
| 5 | 2.7 | 85 |
| 6 | 3.0 | 86 |
| 10 | 4.0 | 86 |

From the above table, it is seen that heat distortion and melt index is not depressed appreciably with small amounts of low molecular weight polystyrene. However, the elongations are in the order of 15 to 20%.

*Example 2*

A high impact polystyrene molding composition was prepared by forming a solution of 6% by weight of S–1006 rubber in styrene to 100 parts of this solution, 3 parts of polystyrene having a molecular weight of 20,000 was added along with 1 part butyl stearate. The solution was then heated for 10 hours at 95° C., 2 hours at 120° C., 2½ hours at 145° C. and 18 hours at 180° C. to effect polymerization of the styrene. The melt index of the resulting polymer was 2.6, the heat distortion temperature was 86° C. and the elongation was 30%. From this example, it is seen that the present invention provides a polymer having both a high heat distortion temperature and a good elongation.

*Example 3*

The procedure of Example 2 is repeated, except that 4 parts of polystyrene having a molecular weight of 20,000 were used. The melt index of the resulting polymer was 2.9, the heat distortion temperature was 85 and the elongation was 26%.

*Example 4*

The procedure of Example 2 is repeated, except that the butyl stearate is replaced with a white mineral oil having an initial boiling point of 356° C. Similarly good results are obtained.

When a high impact polystyrene is made with the rubber loading according to the procedure of the examples but with an appropriate amount (3-4 phr.) of conventional lubricant, the heat distortion temperature is considerably lower. For example, when 3 parts per hundred of white mineral oil as the sole lubricant was used, the heat distortion temperature was about 80° C. Thus, it is seen that the present invention provides an increase in heat distortion temperature on the order of 4 to 5° C. without serious loss in other properties.

I claim as my invention:

1. A method for preparing a moldable composition which comprises admixing 85–98 parts by weight of styrene, 2–15 parts by weight of a styrene-butadiene rubber, 1.5–4.5 parts by weight of a polystyrene having an average molecular weight of 1500–40,000, and 0.5–2.5 parts by weight of butyl stearate, and mass polymerizing said styrene to an average molecular weight above about 100,000.

2. The mass thermal polymerization product of styrene, a butadiene-styrene rubber, a polystyrene having an average molecular weight of 1500–40,000 and butyl stearate, the product comprising 85–98 parts by weight of polystyrene having an average molecular weight above about 100,000; 2–15 parts by weight of a styrene-butadiene rubber; 1.5–4.5 parts by weight of a polystyrene having an average molecular weight of 1500–40,000; and 0.5–2.5 parts by weight of a butyl stearate.

3. A method for preparing a moldable composition which comprises admixing 85–98 parts by weight of styrene, 2–15 parts by weight of a rubbery copolymer of conjugated diolefins with a minor proportion of styrene, 1.5–4.5 parts by weight of a polystyrene having an average molecular weight of 1500–40,000 and 0.5–2.5 parts by weight of aliphatic esters of $C_{14-20}$ saturated fatty acids and $C_{1-8}$ monohydric aliphatic alcohols, and mass polymerizing the styrene monomer, the polystyrene so formed having an average molecular weight in excess of 100,000.

4. The mass thermal polymerization of product of styrene, 2–15 parts by weight of a rubbery copolymer of conjugated diolefins with a minor proportion of styrene, 1.5–4.5 parts by weight of a polystyrene having an average molecular weight of 1500–40,000 and 0.5–2.5 parts by weight of aliphatic esters of $C_{14-20}$ saturated fatty acids and $C_{1-8}$ monohydric aliphatic alcohols, the polystyrene so formed having an average molecular weight in excess of 100,000.

References Cited by the Examiner

UNITED STATES PATENTS

| | | | |
|---|---|---|---|
| 2,606,163 | 8/52 | Morris et al. | 260—31.2 |
| 2,700,185 | 1/55 | Lee | 260—45.5 |
| 2,882,258 | 4/59 | Briggs | 260—31.2 |
| 2,941,978 | 6/60 | Roche et al. | 260—31.2 |
| 2,957,833 | 10/60 | Baum | 260—31.2 |
| 3,022,210 | 2/62 | Philipps | 18—55 |

MORRIS LIEBMAN, *Primary Examiner.*

DANIEL ARNOLD, LEON J. BERCOVITZ, *Examiners.*